United States Patent [19]
Christoleit et al.

[11] Patent Number: 4,916,390
[45] Date of Patent: Apr. 10, 1990

[54] COIL SPRING TOOTHED WHEEL FOR USE IN MEASURING AN ANGULAR VELOCITY

[75] Inventors: Arno Christoleit, Hanover; Lutz Piesbergen, Barsinghausen; Reinhard Schmidt, Lehrte, all of Fed. Rep. of Germany

[73] Assignee: Wabco Westinghouse Fahrzeugbremsen GmbH, Hanover, Fed. Rep. of Germany

[21] Appl. No.: 312,502

[22] Filed: Feb. 17, 1989

Related U.S. Application Data

[63] Continuation of Ser. No. 94,358, Sep. 8, 1987, abandoned.

[30] Foreign Application Priority Data

Oct. 3, 1986 [DE] Fed. Rep. of Germany ....... 3633705

[51] Int. Cl.⁴ .......................... G01B 7/14; G01P 3/48; G01P 3/54; H02K 17/42
[52] U.S. Cl. ..................................... 324/174; 324/262; 324/207.22; 310/168
[58] Field of Search ............... 324/173, 174, 207, 208, 324/262; 336/20; 310/168, 13, 169, 170; 104/281, 284; 246/22 R; 73/518, 519, 520

[56] References Cited

U.S. PATENT DOCUMENTS 3,801,845  4/1974  Gavitt, Sr. .......................... 310/168

FOREIGN PATENT DOCUMENTS 2532574  2/1977  Fed. Rep. of Germany .

OTHER PUBLICATIONS

Frank, "Scheibenaufermalaren" Fienwerktechnik-7-4-1970-Heft 1, pp. 22-24.

Primary Examiner—Reinhard J. Eisenzopf
Assistant Examiner—Walter E. Snow
Attorney, Agent, or Firm—James O. Ray, Jr.

[57] ABSTRACT

The invention consists of a toothed wheel which in conjunction with a fixed sensor measures the revolutions or the angular velocity of a rotating component. The toothed wheel is constructed as a coil spring mounted on a circular ring-shaped mounting device and moved around a pivot with the rotation motion to be measured. The coil spring consists of an infinite helix the windings of which are of ferromagnetic material. Since the coil spring is moved past the fixed sensor, the change of the magnetic field in the coil of the sensor causes the generation of an alternating voltage the frequency of which is substantially proportional to the angular velocity of the toothed wheel.

41 Claims, 2 Drawing Sheets

COIL SPRING TOOTHED WHEEL FOR USE IN MEASURING AN ANGULAR VELOCITY

This is a continuation of co-pending application Ser. No. 07/094,358, filed Sept. 8, 1987, now abandoned.

FIELD OF THE INVENTION

The present invention relates, in general, to measuring equipment and, more particularly, this invention relates to a magnet wheel measuring apparatus for measuring revolutions and/or angular velocity of shafts, axles, wheels, and the like.

BACKGROUND OF THE INVENTION

Prior to the present invention, magnet wheels have been used in conjunction with stators, for example, for monitoring the rotation of shafts, axles, and wheels. In particular, such equipment is useful to monitor vehicle wheels equipped with anti-locking devices. The stator consists, for instance, of a sensor which includes at least a permanent magnet and a coil. The segments of a magnet wheel, also known as a rotor which is connected to the rotating component, cross the electromagnetic field that is generated by the permanent magnet. As a result, the sequence of segments of ferromagnetic material and air gaps causes a change in the magnetic field which induces an alternating voltage in the coil.

The frequency of the alternating voltage generated in this manner is generally proportional to the angular velocity of the wheel. This characteristic allows the calculation of the number of revolutions of the rotating component. This is useful in the case of a wheel of a power vehicle, especially with the aid of the electronic system of an anti-lock device.

A magnet wheel of this kind, constructed in the shape of a disk the periphery of which has been cut to produce substantially evenly-sized air gaps in such a way that a row of teeth is created along the periphery, is known in the prior art.

For example, a magnet wheel of the kind mentioned above has been disclosed to the art from German Patent DE-OS 29 39 643. The magnet wheel taught in this reference consists of a disk-shaped, solid ferromagnetic material which at its periphery has a series of segments oriented in the direction of rotation and consisting each of a tooth and an adjoining, about equally sized air gap. It is known that the manufacture of magnet wheels of this kind is very complex and costly. Such high cost is because the manufacture of such magnet wheels usually requires several operations of chip removing. In addition, the weight of a magnet wheel of this kind, manufactured from ferromagnetic material, makes complex mounting devices necessary to hold the rotor in place. These mounting devices are subject to extremely varied forces particularly when applied in utility vehicles. The construction of the mounting devices is very complex, particularly because even slight spatial deviations between sensor and magnet wheel can cause significant disturbances in signal transmission. These disturbances may lead to faulty brake control in the vehicle wheel concerned. Obviously, this condition is highly undesirable.

Furthermore, magnet wheels of this kind cannot be manufactured in large numbers at an economical price. The reason for such high cost is that almost every vehicle type requires a special method of fastening. Further adding to the cost is the added storage requirement. This is particularly true for retrofitting anti-lock-protected brake systems.

SUMMARY OF THE INVENTION

The present invention teaches a toothed wheel for the measurement of the number of revolutions and/or the angular velocity of a piece of equipment equipped with a sensor. The toothed wheel includes a series of segments which are oriented in the direction of rotation. Such series of segments constitute areas of differing properties with respect to the field to be scanned by the sensor. In the presently preferred embodiment of the invention, these segments are formed by the windings and/or partial windings and the adjoining air gaps of a coil spring.

OBJECTS OF THE INVENTION

It is, therefore, one of the primary objects of the present invention to provide a toothed wheel for measuring revolutions and/or angular velocity of a rotatable component which can be applied almost universally thereby lowering inventory cost.

Another object of the present invention is to provide a toothed wheel which can be manufactured by relatively simple equipment and at relatively lower cost.

Still another object of the present invention is to provide a toothed wheel which will minimize storage requirements.

A further object of the invention is to provide a toothed wheel particularly suitable for use on a vehicle and especially a vehicle equipped with an anti-lock system.

The above and various other objects and advantages of the toothed wheel of the present invention will become more apparent to those persons skilled in the measuring art from the following more detailed description when such description is taken in conjunction with the attached drawings and with the appended claims.

BRIEF DESCRIPTION OF THE INVENTION

Figure 1:
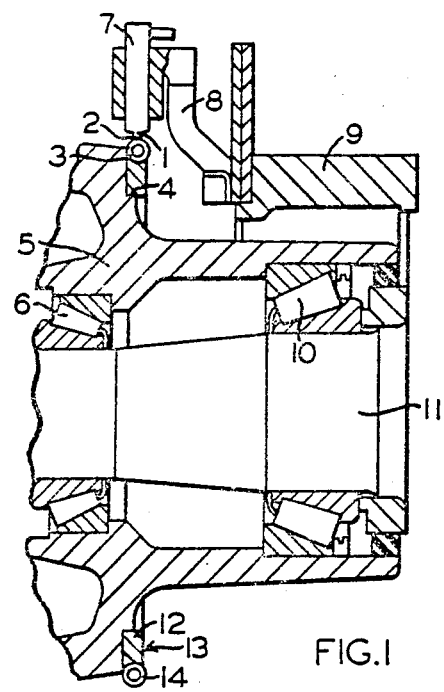
FIG. 1 is a cross-sectional view of a vehicle axle having a toothed wheel constructed in a circular ring at the periphery of the hub and having a sensor installed radially to the toothed wheel.

Now referring more particularly to FIG. 1, it can be seen that the hub 5 of a vehicle wheel, which wheel is not shown, is attached to a part of the axle 11 with the aid of tapered roller bearings 6, 10. The outer periphery of the hub 5 contains a recess 4 serving as a seat for the toothed wheel. The toothed wheel comprises a mounting device 13 and a coil spring 14. The mounting device 13 consists of a support 12 having a circumferential slot 3 formed therein.

The support 12 is constructed as a circular ring the outer periphery of which in the radial direction contains the circumferential slot 3 which has a circular cross-section. The radius of this circular slot 3 is substantially equal to the radius of the outer diameter of the coil spring 14. The slot 3 serves the purpose of holding the coil spring 14 in place during use.

The support 12 consists preferably of ferromagnetic material, though it can also be manufactured from plastic or other materials if desired without departing from the scope of the present invention. Plastic seems to be a good choice wherever the thermal strain caused by the vehicle brakes would not be expected to exceed the limit.

A mounting device 13 applied in existing vehicles can also be constructed as a separate component. The mounting device 13 then comprises two half-shells which are joined on the vehicle to form a circular disk so that it would become unnecessary to dismantle the hub 5.

The circular ring-shaped support 12 becomes dispensable as well when the slot can be applied directly to the periphery of the hub 5 or to other supports. In constructing a new vehicle, this is possible by turning or grinding the slot into a support. The depth of the slot does not need to exceed about one third of the coil spring 14 diameter to assure a secure attachment of the coil spring 14. This is generally sufficient because the helix of the coil spring 14 is drawn into the slot 3 by the force of the spring, it being understood that the force of the spring depends on the material used and the extension of the coil spring 14. If the helix does not consist of spring material, it may also be glued or soldered to the mounting device 13. This could also be done when the coil spring 14 is used, if desired, and would contribute to the secure attachment of the coil spring 14.

If the mounting device 13 used is manufactured from plastic, the slot 3 may be cut much deeper, thereby allowing the coil spring 14 to be attached by snapping it into place and thus is secured particularly well.

Figure 2:
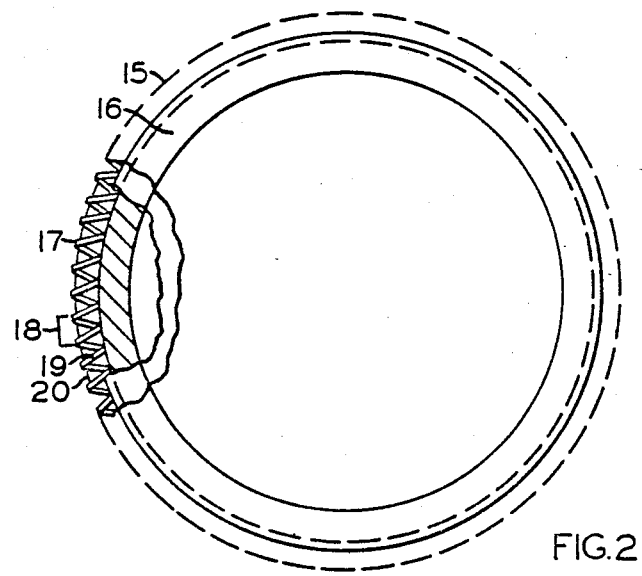
FIG. 2 is a plan view partially in cross-section showing the toothed wheel with a coil spring

FIG. 2 shows a toothed wheel with a coil spring on a mounting device. The coil spring 14 consists of square spring steel, wound into a screw-like spring. The cross-section of the spring wire 17 has about 2 mm-long edges. Wire with a rectangular cross-section of either longer or shorter edges can also be used. The coil spring 14 is constructed in such a way that the air gap 20 between the different wire windings is about as wide as the wire of a winding 19. Each segment 18 of the toothed wheel consists of one winding 19 and the adjoining air gap 20 of the spring coil helix 14. The segment of the extended coil spring 14 is about twice as wide as the wire of a winding 19.

The coil spring ring 15 is of circular shape and constitutes an infinite screw-like helix. The inner diameter of the coil spring ring 15 is slightly smaller than the diameter of the ring-shaped mounting device 16 at the deepest point of the circumferential slot 3. Due to the spring effect, the coil spring ring 15 can easily be placed into the slot 3 and is held in position by the force of the spring.

For refitting existing vehicles, the coil spring ring 15 is measured and supplied by the yard and can be placed around the hub 5 of the vehicle by hard-soldering the two ends of the ring, without requiring a complex mounting procedure.

A sensor 7 (FIG. 1) which is installed in a sensor mounting device 8 attached to the brake anchor plate 9 serves the purpose of measuring the signal. The sensor 7 is installed radially to the toothed wheel. The sensor 7 consists of a rod-shaped permanent magnet positioned perpendicular to the periphery of the toothed wheel. The diameter of the stator pole shoe 1 measures about twice the width of the spring wire in a winding 17, so that an optimal signal is achieved by minimal dispersion of the magnetic field. In this case, the air gap 2 between the stator pole shoe 1 and the coil spring must be kept very small. However, the generation of a signal is still assured with an air gap of up to 1 mm distance.

It is conceivable, nevertheless, that the segments of the toothed wheel can also be scanned by capacitive or mechanical sensor devices.

Figure 3:
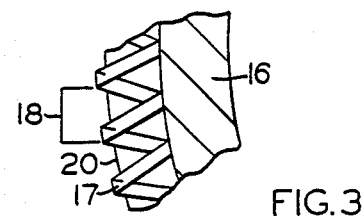
FIG. 3 is an enlarged fragmented cross-sectional view which illustrates a coil spring formed of a wire having a substantially rectangular cross-section.
Figure 6:
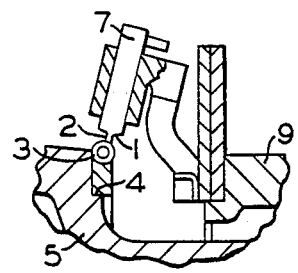

As shown in FIG. 3, the coil spring may be formed from a wire 17 which has a substantially rectangular cross-section. In this case, each segment 18 of the toothed wheel consists of one winding of the wire 17 and an adjoining air gap 20 positioned in a slot on the outer periphery of the mounting device 16.

Figure 4:
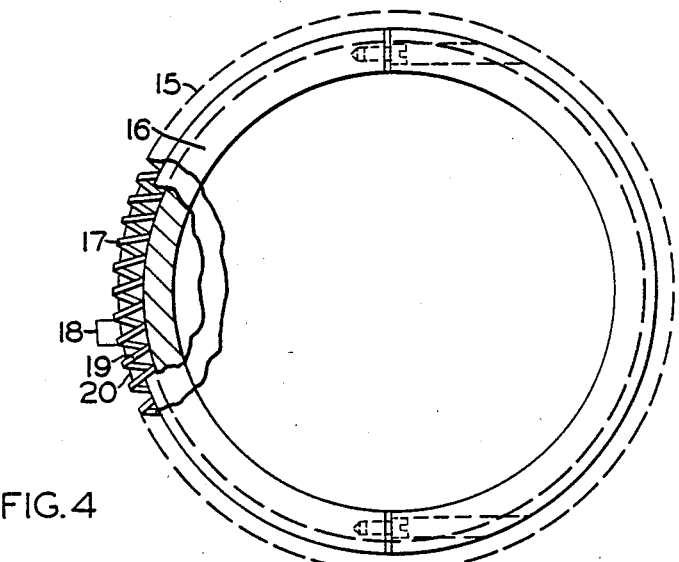
FIG. 4 is a side elevation view partially in cross-section which illustrates a mounting device formed in two parts, these parts are constructed so that they can be attached concentrically to an existing circumferential component.

Now refer more particularly to FIG. 4 wherein there is illustrated a mounting device 16 that is formed in two pieces. Each of these two pieces is constructed in a manner such that it can be attached concentrically to an existing circumferential component. This construction simplifies the retrofitting of an existing component with the toothed wheel of the present invention.

Figure 5:
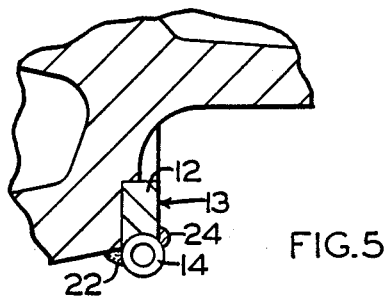
FIG. 5 is an enlarged fragmented view partially in cross-section which illustrates the coil spring connected to the mounting device by one of an adhesive and solder.

In FIG. 5, there is illustrated a coil spring 14 which is attached to the mounting device 13 by one of an adhesive 22 and solder 24.

In summary, commercially available spring wire of substantially rectangular or square cross-section may be used for the manufacture of one advantageous presently preferred embodiment of the toothed wheel of the invention. The wire can be wound into a coil spring in one operation. The resulting coil spring yard wire can then easily be measured and cut for the different spring sizes. Once the two ends of the coil spring are hard-soldered, the wheel is almost ready for application.

A particularly advantageous embodiment makes it possible to prepare vehicle systems (anti-lock system, for instance) for the application of the toothed wheel according to the invention by providing any rotating axle (vehicle axles or wheel, for instance) of a new vehicle with the appropriate slots so that a toothed wheel can be installed by just having the coil spring snap into the slots.

Refitting of an existing vehicle is equally simple. In another presently preferred embodiment, plastic mounting devices, which are easily adaptable even for different types of vehicles, can be used. These can also be supplied in several components as half-shells so that it will no longer be necessary to dismantle any wheel and axle parts.

An advantageous embodiment is available for vehicles lacking space or presenting mounting problems; here the extension of the sensor may be attached not only radially or axially, but also in other positions between these because of the circular shape of the coil spring.

A toothed wheel of this kind, consisting of a coil spring, also is relatively light due to the small mass of ferromagnetic material, and can, therefore, as well be advantageously applied in the area of passenger cars where its low weight would lead to energy savings.

However, a toothed wheel of this kind is not only conceivable for application in the construction of vehicles, but wherever the displacement of objects around their pivots is to be determined.

While a number of presently preferred embodiments of the present invention have been described in detail above, it should be understood by those persons who are skilled in the measuring art that other modifications and adaptations can be made without departing from the spirit and scope of the attached claims.

We claim:

1. A coil spring toothed wheel for use with a sensor equipped with a permanent magnet for measurement of at least one of a number of revolutions and an angular velocity of a component, said coil spring toothed wheel comprising: a series of segments oriented in a direction of rotation and constituting areas of differing properties with respect to a magnetic field to be generated and scanned by such sensor, said series of segments formed by a plurality of a winding and an adjoining air gap of a helical coiled ferromagnetic wire of a coil spring, a width of said wire being approximately equal to a width of an adjoining air gap between a winding of said coil spring, said ferromagnetic wire being wound in a direction of a longitudinal axis of said coil spring to form successive segments of ferromagnetic material and non-ferromagnetic material.

2. A coil spring toothed wheel, according to claim 1, wherein such component is a vehicle wheel and said coil spring toothed wheel is secured to a hub of such wheel.

3. A coil spring toothed wheel, according to claim 1, wherein such component includes a mounting device for said coil spring.

4. A coil spring toothed wheel, according to claim 3, wherein said mounting device is a support member having a slot formed therein.

5. A coil spring toothed wheel, according to claim 1, wherein said coil spring is formed of wire which has a substantially rectangular cross-section.

6. A coil spring toothed wheel, according to claim 3, wherein said coil spring is formed of wire which has a substantially rectangular cross-section.

7. A coil spring toothed wheel, according to claim 3, wherein said mounting device consists of a support and said coil spring is attached to said mounting device by spring tension.

8. A coil spring toothed wheel, according to claim 4, wherein said coil spring is held in said slot by spring tension.

9. A coil spring toothed wheel, according to claim 6, wherein said mounting device consists of a support and said coil spring is attached to said mounting device by spring tension.

10. A coil spring toothed wheel, according to claim 4, wherein said support is constructed of one of moulded plastic and turned metal.

11. A coil spring toothed wheel, according to claim 8, wherein said support is constructed of one of moulded plastic and turned metal.

12. A coil spring toothed wheel, according to claim 4, wherein said slot is constructed so that said coil spring can be snapped into it.

13. A coil spring toothed wheel, according to claim 8, wherein said slot is constructed so that said coil spring can be snapped into it.

14. A coil spring toothed wheel, according to claim 3, wherein said mounting device includes at least two parts, each one of said at least two parts is constructed such that it can be attached concentrically to an existing circumferential object.

15. A coil spring toothed wheel, according to claim 4, wherein said mounting device includes at least two parts, each one of said at least two parts is constructed such that it can be attached concentrically to an existing circumferential object.

16. A coil spring toothed wheel, according to claim 6, wherein said mounting device includes at least two parts, each one of said at least two parts is constructed such that it can be attached concentrically to an existing circumferential object.

17. A coil spring toothed wheel, according to claim 7, wherein said mounting device includes at least two parts, each one of said at least two parts is constructed such that it can be attached concentrically to an existing circumferential object.

18. A coil spring toothed wheel, according to claim 8, wherein said mounting device includes at least two parts, each one of said at least two parts is constructed such that it can be attached concentrically to an existing circumferential object.

19. A coil spring toothed wheel, according to claim 9, wherein said mounting device includes at least two parts, each one of said at least two parts is constructed such that it can be attached concentrically to an existing circumferential object.

20. A coil spring toothed wheel, according to claim 10, wherein said mounting device includes at least two parts, each one of said at least two parts is constructed such that it can be attached concentrically to an existing circumferential object.

21. A coil spring toothed wheel, according to claim 12, wherein said mounting device includes at least two parts, each one of said at least two parts is constructed such that it can be attached concentrically to an existing circumferential object.

22. A coil spring toothed wheel, according to claim 4, wherein said slot is circular in cross-section.

23. A coil spring toothed wheel, according to claim 8, wherein said slot is circular in cross-section.

24. A coil spring toothed wheel, according to claim 10, wherein said slot is circular in cross-section.

25. A coil spring toothed wheel, according to claim 12, wherein said slot is circular in cross-section.

26. A coil spring toothed wheel, according to claim 15, wherein said slot is circular in cross-section.

27. A coil spring toothed wheel, according to claim 3, wherein said coil spring is connected to said mounting device by at least one of an adhesive and solder.

28. A coil spring toothed wheel, according to claim 6, wherein said coil spring is connected to said mounting device by at least one of an adhesive and solder.

29. A coil spring toothed wheel, according to claim 7, wherein said coil spring is connected to said mounting device by at least one of an adhesive and solder.

30. A coil spring toothed wheel, according to claim 10, wherein said coil spring is connected to said mounting device by at least one of an adhesive and solder.

31. A coil spring toothed wheel, according to claim 12, wherein said coil spring is connected to said mounting device by at least one of an adhesive and solder.

32. A coil spring toothed wheel, according to claim 14, wherein said coil spring is connected to said mounting device by at least one of an adhesive and solder.

33. A coil spring toothed wheel, according to claim 22, wherein said coil spring is connected to said mounting device by at least one of an adhesive and solder.

34. A coil spring toothed wheel, according to claim 3, wherein said sensor is an inductive sensor and said mounting device is positioned in a manner such that said inductive sensor can be attached in different positions along a periphery of said winding of said coil spring.

35. A coil spring toothed wheel, according to claim 6, wherein said sensor is an inductive sensor and said mounting device is positioned in a manner such that said inductive sensor can be attached in different positions along a periphery of said winding of said coil spring.

36. A coil spring toothed wheel, according to claim 7, wherein said sensor is an inductive sensor and said mounting device is positioned in a manner such that said inductive sensor can be attached in different positions along a periphery of said winding of said coil spring.

37. A coil spring toothed wheel, according to claim 10, wherein said sensor is an inductive sensor and said mounting device is positioned in a manner such that said inductive sensor can be attached in different positions along a periphery of said winding of said coil spring.

38. A coil spring toothed wheel, according to claim 12, wherein said sensor is an inductive sensor and said mounting device is positioned in a manner such that said inductive sensor can be attached in different positions along a periphery of said winding of said coil spring.

39. A coil spring toothed wheel, according to claim 14, wherein said sensor is an inductive sensor and said mounting device is positioned in a manner such that said inductive sensor can be attached in different positions along a periphery of said winding of said coil spring.

40. A coil spring toothed wheel, according to claim 22, wherein said sensor is an inductive sensor and said mounting device is positioned in a manner such that said inductive sensor can be attached in different positions along a periphery of said winding of said coil spring.

41. A coil spring toothed wheel, according to claim 26, wherein said sensor is an inductive sensor and said mounting device is positioned in a manner such that said inductive sensor can be attached in different positions along a periphery of said winding of said coil spring.

* * * * *